United States Patent [19]
Zenk

[11] 3,912,398
[45] Oct. 14, 1975

[54] STROBOSCOPIC CELESTIAL SCANNER

[75] Inventor: George Edward Zenk, Minneapolis, Minn.

[73] Assignee: Control Data Corporation, Minneapolis, Minn.

[22] Filed: Dec. 21, 1973

[21] Appl. No.: 427,185

[52] U.S. Cl. ................. 356/152; 33/268; 250/203 R
[51] Int. Cl. ............................................. G01b 11/26
[58] Field of Search ........... 356/28, 152; 250/203 R; 244/171; 33/268

[56] References Cited
UNITED STATES PATENTS

| | | | |
|---|---|---|---|
| 3,185,852 | 5/1965 | Lewis | 250/203 R |
| 3,290,933 | 12/1966 | Lillestrand et al. | 250/203 R |
| 3,388,629 | 6/1968 | Brenholdt et al. | 250/203 R |
| 3,723,745 | 3/1973 | Fletcher et al. | 250/203 R |
| 3,783,271 | 1/1974 | Abbott, Jr. et al. | 250/203 R |

Primary Examiner—Richard A. Farley
Assistant Examiner—S. C. Buczinski
Attorney, Agent, or Firm—Edward Schwarz; Joseph Genovese

[57] ABSTRACT

Apparatus employing a plurality of radiation sensors mounted in a rotating body, and successively enabled to sense radiation as their fields of view sweep across a radiation source emitting radiation too faint to be separable from the background noise by conventional means. By summing the signals from the sensors, the signal-to-noise ratio can be sufficiently improved to allow an accurate determination of the angular position of the body with respect to the radiation source, and the angular velocity of the rotating body. In a preferred embodiment, the sensors are grouped into pairs having adjacent fields of view, and each pair is enabled separately as their combined fields of view sweep across adjacent but non-overlapping areas which, together contain the radiation source. The difference in output signals between the sum of the signals from the left-hand sensors and the sum of the signals from the right-hand sensors is a measure of the angular position and velocity of the rotating body with respect to the radiation source at the time each pair of sensors were enabled.

16 Claims, 10 Drawing Figures

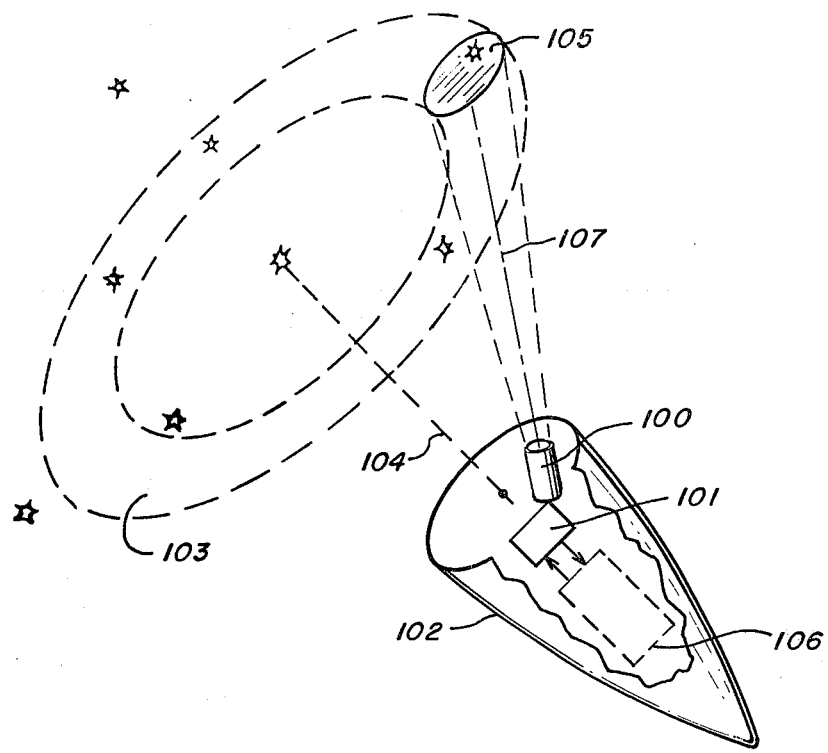
FIG. 1
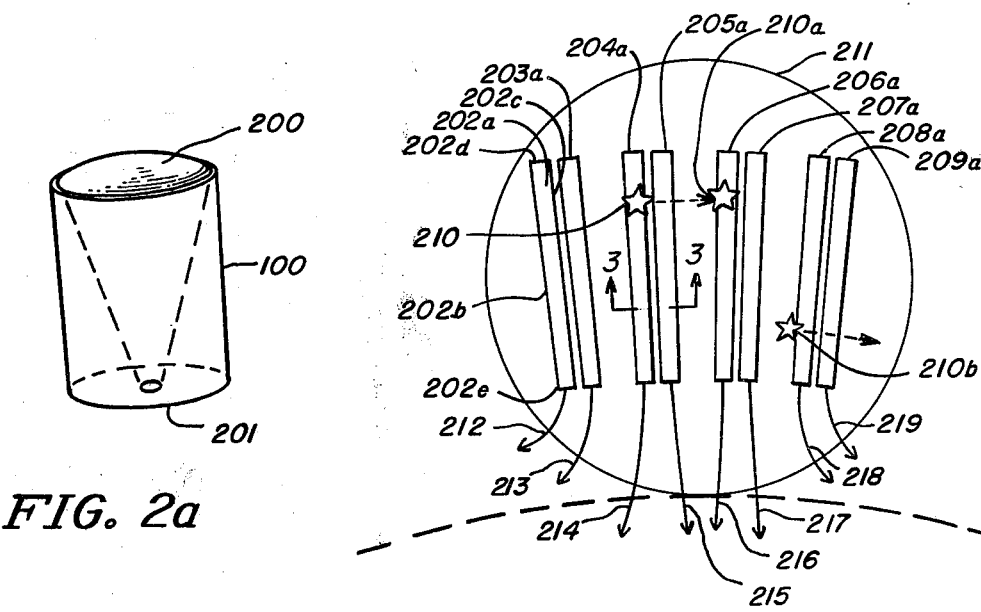
FIG. 2a
FIG. 2c

STROBOSCOPIC CELESTIAL SCANNER

BACKGROUND OF THE INVENTION

1. Field of the Invention

This invention relates to astronomical detection and tracking of celestial objects using opto-electric devices mounted on a rotating body in space, such as a spin-stabilized satellite. The results of such operations can then be used to make attitude determinations, e.g. to allow desired orientation of the vehicle.

2. Description of the Prior Art

U.S. Pat. No. 3,599,001, Rolnik, et al. described apparatus employing radiation sensors surrounding a center apex or point. Unbalance in the amount of radiation received by the sensors is employed to drive the assembly on which the sensors are mounted to point more directly at the radiation source, balancing the radiation received by the sensors and providing an indication of the angular position of the radiation source with respect to the sensors. U.S. Pat. Nos. 3,448,273 (Webb); 3,719,424 (Weischedel); 3,493,765 (Kelly et al.); and 3,626,192 (Held) all use a plurality of radiation sensors to determine angular orientation of the device with respect to a radiation source such as a star, nuclear blast, etc.

SUMMARY OF THE INVENTION

Various space vehicles and satellites now in use or under development are designed to rotate during or after launch, for the purpose of stabilizing them in a desired orientation with respect to the celestial sphere. Additionally, in those vehicles intended for occupation by humans, rotation of the vehicle is to date the only means by which a substitute for gravity can be created, through the effect of centripetal force. In such rotating vehicles, it is significantly more difficult to navigate because the usual on-board inertial guidance platform is, of course, affected by the rotation of the body. An alternative means for attitude determination uses radiant energy from various heavenly bodies, such as stars, the planets and their various moons, and the sun, as reference points.

By the term "radiant energy" will be meant any type of electromagnetic energy. The terms "light," "light rays," "radiant energy," and "radiation" will be used interchangeably. The invention is applicable, with suitable changes in certain elements, to all of these types of energy. Similarly, the terms "photocell" and "photodiode" may be used interchangeably with "radiation sensor" or "sensor." Stars are the most likely source of such radiation and hence the term "radiation source" is to be understood to mean and is used interchangeably with the term "star" when light is the type of radiation involved.

If a conventional star mapper is used, the rotation of the vehicle allows only brief scans of the radiation source as the vehicle rotates. For this reason, only the very strongest radiation sources have been, prior to this invention, suitable because of the brief time during which the field of view of the sensor is directed toward the radiant energy source during each revolution.

To make possible the use of these very faint radiation sources, my device employs a plurality of conventional radiant energy sensors mounted within the rotating vehicle and receiving radiation from these sources during each revolution. Each sensor has a predetermined, relatively small field of view and is so oriented that this field of view sweeps through a predetermined continuous band around the celestial sphere, said band to be referred to hereinafter as the annulus. At least one star or other radiation source too faint to be detectable with apparatus now available is assumed to be located within this annulus. This is a reasonable assumption because of the density of the radiation sources (stars) of the magnitude involved, in the heavens. As the vehicle rotates, in the preferred embodiment the sensors are enabled such that a first plurality of sensors will each produce an output signal measuring the radiation produced within their field of view while their fields of view are sweeping over, or directed toward a first selected area of the annulus. A second plurality of sensors produce an output measuring the radiation received while the field of view of each is sweeping over or directed toward a second selected area. These two selected areas must be quite close together, and preferably contiguous, so that radiation from a source will be divided between the areas. The location of these two selected areas is dependent, of course, on the time at which the sensors are enabled. It should be understood that although the sensors are spoken of as being enableable, in actuality they may continuously be emitting a signal indicative of the radiation striking them, and are considered to be enabled only when the signal is gated to the elements which process their signals. It should also be understood that there is no difference in the contemplated use whether the sensor actually emits its signal only when receiving an enable signal, or if it continuously emits the signal which is gated to the processing elements when an enable signal causes a path to be created to the processing elements.

It is assumed that the angular velocity of the vehicle and the position of the radiation source (or sources) within the annulus are approximately known. This information can be determined from conventional means whose accuracy is not acceptable for high precision attitude determination. By properly selecting the time at which the sensors assigned to the first and second selected areas are enabled using the approximate angular rotation data, the two sensing areas may be located to place the radiation source within one or both of them.

After the sensing areas have been roughly aligned in this manner with the radiant energy source, the outputs indicative of the energy received by the sensors during their scan of the first sensing area are integrated to form a single composite signal containing both noise (background radiant energy and noise inherent in the circuitry) and the composite response of the sensors caused by the radiant energy from the source. A similar integration is performed by a standard integrator for the output signals from the sensors which scan the second selected area. I have discovered that by integrating the signals from a plurality of sensors, each scanning a particular area containing a faint radiation source, an accurate relative measure of the strength of the source is formed. That is, the signal-to-noise ratio can be significantly improved in this manner. A portion of the light from the source will fall in each area. The difference in magnitude of the integration signals from the first and second areas is a measure of how the radiant energy from the source is split between the two areas. If the sensors are not enabled at the proper time, the selected areas will be placed improperly relative the radiant energy source, and one integration signal will be greater than the other. By appropriately delaying or advancing the times the enable signals for the sensors scanning the first and second areas are issued, the two selected areas can be moved to straddle the radiant energy source, i.e. the integration signals will equal each other. When this occurs, then the exact orientation of the vehicle at the time each sensor was enabled is known, since the orientation of the sensors in the vehicle is accurately known. When the enable signals are emitted such that the integration signals do not change from one rotation to the next, the time between issuance of the enable signal for a specific sensor scanning the first (or second) area for successive rotations is the exact period of rotation. The period of rotation is useful in missile guidance and space navigation. When three stars of known position have been acquired, the exact attitude of the space vehicle can be conventionally determined.

In a preferred embodiment, one half the sensors scan the first selected area and one half the second. Assume the fields of view of the sensors are numbered in ascending order from 1 as they pass over the selected areas of the annulus. The sensors having the odd numbered fields of view are preferably assigned to one area, and the sensors having the even-numbered fields of view are assigned to the other. Each odd-numbered sensor is enabled simultaneously with the even-numbered sensor having a number one greater, and the areas of the annulus over which the fields of view of the two sweep while enabled define the two selected areas. Another mode of operation is for each sensor to be enabled as its field of view sweeps through the first selected area, and its output to be integrated, forming a part of the first integration signal. As each sensor's field of view sweeps through the second area, it is enabled and its output signal integrated to form a part of the second integration signal.

For best accuracy, it is necessary to employ a feedback loop which performs the actual comparison between the first and second integration signals resulting from each individual rotation. The difference between the total amounts of radiant energy sensed within the first area and within the second area, as measured by the first and second integration signals forms an error signal. This error signal can be used to vary the time at which each sensor is enabled on successive revolutions of the body to cause the amount of radiant energy sensed from each area during a revolution to be equalized. The amount of time between the start of successive scans is precisely the period of revolution of the vehicle when all drift has been eliminated in the integration signals.

BRIEF DESCRIPTION OF THE DRAWINGS

FIG. 1 is a sketch of the environment for which this apparatus is designed, and displays its location in a rotating space vehicle.

FIG. 2a shows the optical system which receives radiant energy from a radiant energy source, such as a star and focuses it in a focal plane.

FIGS. 2c and 2d are plan views of one arrangement of the sensing surfaces.

DESCRIPTION OF THE PREFERRED EMBODIMENTS

Figure 2D:
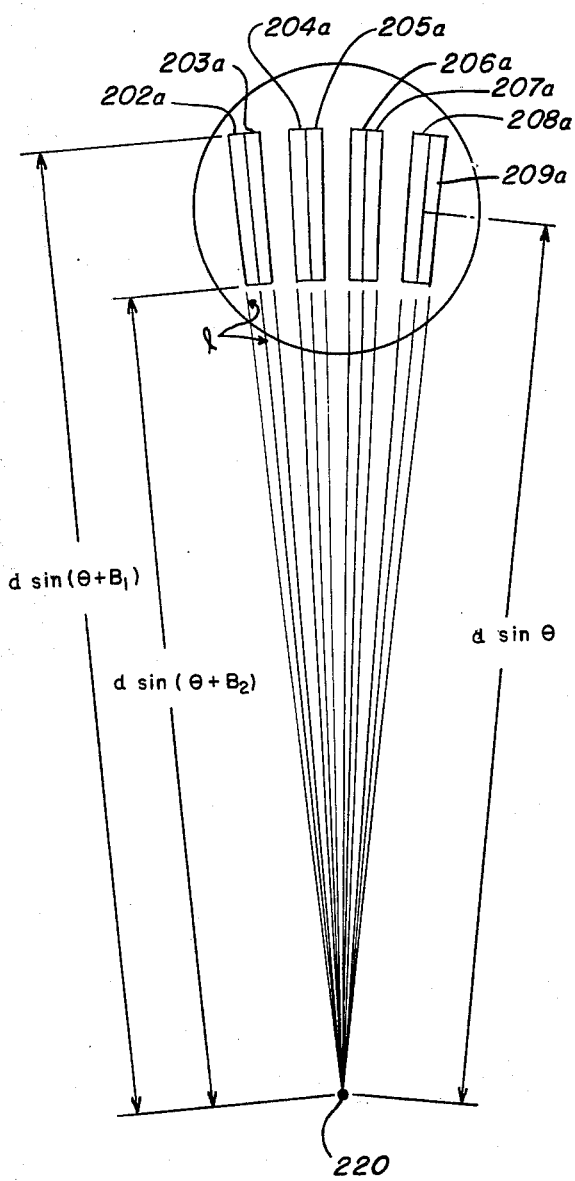

Referring first to FIG. 1, rotating vehicle 102 is shown suspended in space. Mounted within vehicle 102, optical system 100 contains a plurality of radiant energy sensors located so that the fields of view of the sensors have a common scan annulus 103 as vehicle 102 rotates. Annulus 103 is concentric with spin axis 104 of vehicle 102; thus, any of the stars or other radiant energy sources which fall within scan annulus 103 of optical system 100 and are sufficiently strong sources of radiant energy to be detectable, are available for use in determining angular position and angular velocity of body 102. It is estimated that this apparatus will have available in any annulus, at least 3 stars of adequate magnitude, whereas with conventional means, there might be but 3 or 4 suitable in the entire celestial sphere. Control apparatus 101, which may include a digital computer, is shown as mounted within the body 102, but may be located remote from body 102 and be telemetrically connected to the optical system 100. Control apparatus 101 receives approximate body position parameters from inertial reference 106.

Referring next to FIG. 2a, optical system 100 is a conventional arrangement of lenses which gathers visible starlight impinging on its objective lens 200 and focuses this light at focal plane 201. Focal plane 201 is merely the plane in space at which the star appears most sharply focussed. As vehicle 102 rotates, the images of the stars appear to move across focal plane 201 in a direction opposing the direction of the body's rotation. Optical system 100 is a conventional arrangement of lenses which allows the rotation of vehicle 102 to cause the star images to move in the usual (for systems of this type) circular arc path on focal plane 201. The path actually comprises a portion of an "image path" circle whose radius is $d \sin \theta$ where d is the focal length of optional system 100 and $\theta$ is the angle between axis of rotation 104 and optical axis 107 as shown in FIG. 1. (See infra FIG. 2d and discussion.) Assuming optical axis 107 is not bent by mirrors or prisms within optical system 100, the center of the image path circle lies on a line between optical axis 107 and axis of rotation 104. The art of designing such optical systems is well known, and no further discussion of its operation is deemed necessary.

Figure 2B:
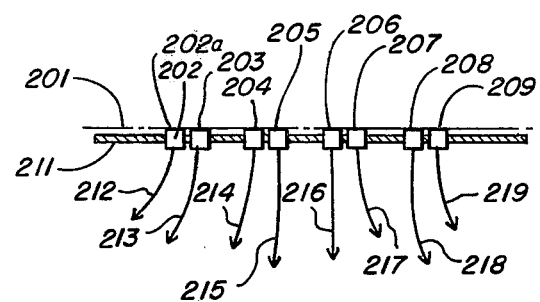
FIG. 2b is an edge view of the focal plane with a plurality of sensors disposed beneath it.

Referring next to FIG. 2b, focal plane 201 is shown on edge with sensors 202–209 held beneath it by support 211 which itself is rigidly fixed to the housing of optical system 100. Sensor 202 is shown with its sensing surface 202a as indicated, on edge and coplanar with focal plane 201. Sensors 203–209 have similar sensing surfaces similarly located associated with them. Lines or terminals 212–219 transmit the signal from sensor 202–209 to the processing apparatus of FIG. 4a.

In FIG. 2c, sensing surfaces 202a–209a and focal plane 201 are shown in plan view. Sensors 202–209 are arranged in pairs, each pair separated from the adjacent pair(s) by equal amounts, with the sensors of each pair separated by equal amounts. The shape of each sensing surface 202a–209a can be described by reference to typical surface 202a and FIG. 2d where the sides 202b and 202c are shown as segments of radii centered at the image path circle center 220. With this shape, the transit time of an image of any body in the celestial sphere as projected on focal plane 201 between sides 202b and 202c as vehicle 102 rotates will be independent of its position vis-a-vis sides 202d and 202e. Sides 202d and 202e are preferably circular arcs concentric with the image path circle, as shown in FIG. 2d, although small deviations from this ideal will result in only small errors, when a star image is very near either side 202 d or 202e. Sensing surfaces 203a–209a are similarly shaped.

In an embodiment such as this one, sensors 202–209 share a single optical system. When dealing with light as the radiant energy involved, this embodiment is much preferably because of the lower cost and greater accuracy. However, if radio wave sources were used, individual directional antennae might be necessary, since satisfactory focusing of a radio wave might not be possible. Whether individual focusing systems, or a common one is used, it simplifies matters greatly to speak of the "field of view" of each sensor 202–209. If one were to consider the entire optical system 100 as being momentarily fixed with respect to the celestial sphere, by field of view of a particular sensor 202–209 is meant the area of the celestial sphere within which a point source of light must be placed to cause its light to strike the sensing surface of the sensor whose field of view is involved. The field of view of each sensor 202–209 has a corresponding area in focal plane 201 which, of course, is precisely that occupied by the sensing surface involved. It is convenient to regard the movement of a star (caused by rotation of body 102) across the fields of view of sensors 202–209 as actually being the movement of its image in focal plane 201 sensing areas 202a–209a. It is also convenient to think of a particular sensing surface as identical with the field of view of the associated sensor as regards to the movement of a star and star image with respect to optical system 100 and field of view 201. The movement of any star image, such as that of image 210 to position 210a in focal plane 201 is a circular arc centered at the center of the image path circle, as earlier defined.

Each sensor 202–209 is chosen to produce an output signal on their respective output terminals or lines 212–219 which varies in a predictable and uniform fashion with the amount of radiant energy received by each sensor over its entire area per unit time. The assumption will be made hereafter that sensor output on any terminal 212–219 is a voltage which increases proportionally with total light energy striking the associated sensing surfaces. Any deviation from this deal can be dealt with by modifying sensor output in a predetermined fashion electronically. In actuality, it is sufficient if sensor output increases monotonically with increasing illumination, in some sort of continuous curve. It is advantageous that sensors 202–209 be selected for fast response of their respective outputs to any change in radiant energy impinging on the sensors themselves. It is even more essential that response times be as near identical as possible from one sensor to the next. Response times in the tens of micro-seconds are the slowest which will permit high precision resolution of vehicle 102 attitude.

It is preferrable although not necessary that each sensing surface 202a–209a have identical dimensions, and this will be assumed in the remainder of the discussion. Taking surface 202a again as exemplary and referring to FIGS. 2c and 2d, the distances between sides 202b and 202c is seen to be strictly a function of the angle between these two sides. Due to the previously discussed geometry of the entire system, this angle is also the angle in the annulus subtended by the field of view of the sensor, i.e. the angle through which one side of a field of view must be moved, to fall on the other. The dimensional relationship between sides 202d and 202c is defined by the angular displacement from optical axis 107 of the corresponding edges of the field of view, say $\beta_1$ and $\beta_2$. The actual ideal shape of sensing surfaces 202a can then be defined in terms of $\alpha$, $\beta_1$, $\beta_2$, $\theta$, and d as follows: sides 202b and 202c and corresponding sides for sensing surfaces 203a–209a are all radii of the image path circle, each pair for a sensing surface forming an angle. Side 202d and corresponding sides of sensing surfaces 203a–209a are all arcs of a circle concentric with the image path circle and having radius of $d \sin(\theta + \beta_1)$. Side 202e and corresponding sides are arcs of a similarly concentric circle having radius of $d \sin(\theta - \beta_2)$. Although a variety of factors are involved, it is recommended that the field of view of each sensor 202–209 subtend, i.e. equal, a few minutes of arc of scan annulus 103. Ideally, the adjacent edges of the fields of view of sensor pairs such as sensors 202 and 203, 204 and 205, etc. are separated by a fraction of their angular width. It is quite important that the width of each sensor 202–209 field of view be small enough compared with inherent sensor sensitivity, to usually prevent more than one detectable star from falling in its field of view at any one time. Distance between adjacent pairs of sensors, such as that between sensor 203 and 204 can be a similar order of distance or even somewhat greater.

As vehicle 102 rotates, image 210 formed by a particular radiant energy source such as a star will move, over a period a few milliseconds, from its original position as shown to position 210a within the field of view of sensors 206 and 207. (Remember that the movement of a sensor's field of view with respect to a star is to be considered indistinguishable from that of a star image on the associated sensing surface.) When image 210 is wholly within sensing surface 204a, voltage on line 214 is a relative maximum indicating that maximum radiant energy from the star is striking sensor 204. As image 210 moves toward position 210a, the continuing decrease in the signal on terminal 214 indicates decreased energy striking sensor 204. The variation which sensor 204 experienced is duplicated by sensor 205 as the field of view of sensor 205 sweeps across the star forming image 210. Similar responses from sensor 202–203 and 206–209 have occurred or will occur as image 210 sweeps across their respective fields of view. In each case, the respective line 212–219 will provide a signal indicating the rate at which radiant energy falls on its associated sensor from within its field of view.

Figure 3:
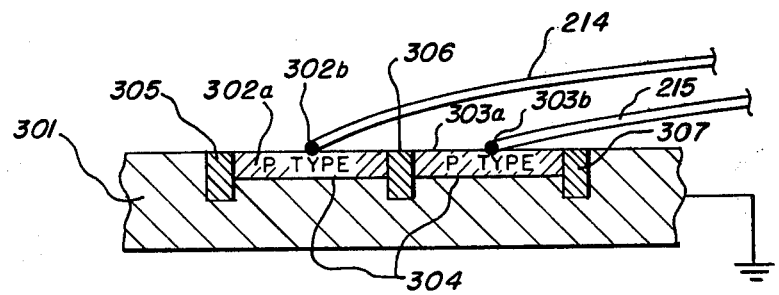
FIG. 3 is an edge view of a semi-conductor implementation of the sensors as shown in FIG. 2c.

Referring next to FIG. 3, a possible construction for a typical pair of sensors 204 and 205 is displayed as a cross section of FIG. 2c. Sensors so created comprise photodiodes. Substrate 201 is a standard N-type silicon wafer. Inserted in grooves therein and corresponding to sides 202b and 202c of sensor 202 are insulating strips 305 and 306. Insulating strips 306 and 307 form the corresponding sides of sensor 203. These insulating strips may be mechanically inserted, or placed therein by chemical deposition means. P-type silicon diffusion layers 302a and 303a between insulating strips 305 and 306, and 306 and 307, actually form the photosensitive surfaces. These surfaces preferably have the exact shape described for sensing surfaces 202a and 203a. It should be understood of course that all eight sensors will usually be placed on a single substrate 301 in an actual embodiment, and that only a portion of the substrate is shown in FIG. 3. Welds 303a and 303b connect lines 214 and 215 to the P-type silicon layers 302a and 303a. Although junctions 304 between the P-type and the N-type silicon are shown to have a definite line of demarcation, in actuality there is a significant area of diffusion where the percentage of P-type and N-type material varies with the distance from the interface. Such photodiode technology is old in the art. Only the shapes and relative locations of the sensing areas are novel.

The photocells of FIG. 3 can be operated in either the photovoltaic or the back-biased modes. In the first, a current is produced by each photocell proportional to the number of photons striking the sensing surface, for the illumination levels here involved. In the back-biased mode, impedance decreases with increase in illumination, the response being similarly linear with a DC current supply, to the limit of the current-carrying capacity of an individual diode.

It is important that paired sensors 202 and 203, 204 and 205, etc., have nearly identical signal outputs for identical illuminations. If this condition cannot be achieved within the sensors themselves, it can be achieved by use of amplifiers, voltage dropping resistors, or other means external to the sensors. For this configuration of sensors, it is not particularly essential that left hand sensors 202, 204, 206, and 208 respond identically, since these outputs are not compared to each other, either singly or in summation.

Figure 4A:
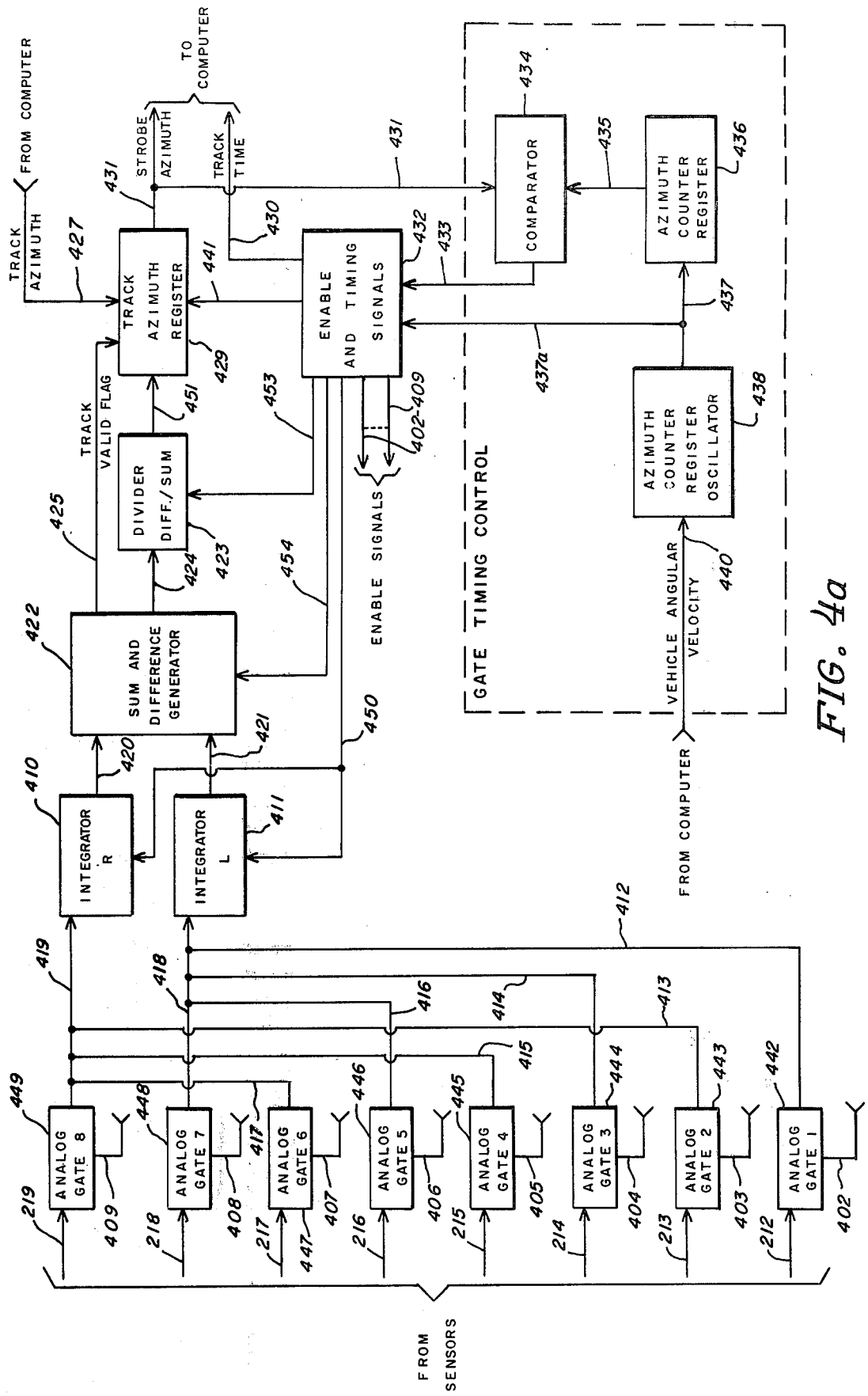
FIGS. 4a and 5 are block diagrams of apparatus for processing the sensor outputs.

FIG. 4a is a block diagram of an attitude determination system employing a plurality of radiant energy sensors according to the teaching of this invention. Lines 212–219 are extensions of those shown in FIG. 2b and 2c and supply the signal voltages from sensors 202–209 to the inputs of analog gates 1–8, 442–449, respectively. Analog gates 442–449 allow the input voltages received on lines 212–219 respectively to appear on lines or terminals 412–419, respectively when an enabling voltage is placed on control terminal 402–409, respectively. Once the enable voltage is removed, the voltage on line 419 becomes 0. Each analog gate is designed to respond very rapidly to the presence or absence of an enable signal. Here too, it is highly desirable that gates receiving the voltages from paired sensors, such as analog gates 448 and 449 have nearly identical response times, and respond identically to identical input voltages. That is, it is not necessary that the output voltage on line 419 be exactly 1 volt if the input voltage on line 219 is 1 volt. If a difference is present, however, it is desirable that the output voltages of gates for paired sensors, be identical for identical input voltages. Lastly, assume that the impedance looking into each output line 412–419 is infinite when its associated gate is disabled, so that the output of each enabled gate will not be affected while being presented to integrators R and L. Such devices are well known in the signal gating and switching field.

The output voltages of analog gates 442, 444, 446, and 448 respectively are applied to input terminal 419 to integrator L, 411. Similarly, the output voltages of 443, 445, 447, and 449 are applied to input terminal 418 of integrator R 410. Integrators R and L 410 and 411 are well known, standard devices which produce outputs on their respective lines or terminals 420 and 421 proportional to the time rate integrals of voltage previously applied to their input terminals 418 and 419. Control line 450 supplies a signal to integrators R and L 410 and 411 which resets the accumulated integral to zero upon receipt.

At this point, it seems desirable to digress for a moment and discuss the various aspects of analog versus digital signals. It should be understood thaat at any point within this apparatus the analog signal may be converted to digital and the processing done thereafter digitally. It probably is not desirable to convert sensor 202–209 outputs directly to digital before passing them through analog (digital if so done) gates 442–449, because of the extra number of analog to digital converters which would be required. In principal, however, it is merely a matter of engineering judgment in determining where, or if, the analog signals will be converted to digital. For convenience, assume that the two input voltages sent on lines 420 and 421 to sum and difference generator 422 are converted to digital values within sum and difference generator 422, so all further processing performed on them is done digitally. The particular choice of the point of conversion should not be considered part of this invention. The discussion will assume no difference in the processing activity regardless of the form of the signals.

Sum and difference generator 422 receives the outputs of integrators R and L 410 and 411 on lines 420 and 421 and forms both the sum and difference of the two. For convenience, assume the output of integrator R 410 is subtracted from that of integrator L 411 in forming the difference. If the sum is below a certain preselected value, the track valid flag supplied on line 425 will not be set, indicating that so little radiant energy was received that a radiant energy source of acceptable strength was not within the fields of view of sensors 202–209. The values of the sum and difference are sent on line 424 to divider 423, which divides the difference by the sum to normalize the difference. Divider 423 then supplies this normalized difference on line 451 to an input terminal of track azimuth register 429, responsive to an appropriate timing signal on line 440. Track azimuth register 429 also receives an approximate azimuth value on line 427 from computer 106. The normalized difference from divider 451 is used to directly correct any error in the azimuth value received by track azimuth register 429 from computer 106. If the difference is zero, then the azimuth received by track azimuth register 429 and from the computer is precisely correct. If it is either greater than or less than zero, this means that the azimuth within track azimuth register 429 must be changed to more accurately record the azimuth of body 102.

The proper times for enabling analog gates 1–8, 442–449 is determined by enable and timing signals (ETS) subsystem 452. As has been mentioned previously, the best approximation of the azimuth aand angular velocity of body 102 available, either from other sources or from previous operation of this apparatus are available at all times within the computer. The computer supplies a vehicle angular velocity signal at all times on line 440 to azimuth counter register (ACR) oscillator 438. ACR oscillator 438 sets its frequency responsive to the computer-supplied vehicle angular velocity on line 440 and provides pulses at this rate on line 437 to azimuth counter register 436, and on line 437a to ETS subsystem 432. This causes the azimuth value in azimuth counter register 436 to increase at a rate approximately corresponding to the angular velocity of body 102. Thus, azimuth counter register 436 maintains an approximate azimuth value for body 102 with respect to an arbitrarily selected angular datum position of body 102.

Body angular velocity can be approximately determined from at least two sources. Before acquisition of a star by this apparatus, an inertial platform may provide an approximate value. After the apparatus has locked onto a star or other radiant energy source, the computer supplies the values as determined by previous operation of this apparatus. That is, computer 106 records successive track azimuths supplied to it and determines the error in the body angular velocity which the change in successive track azimuths displays. These changes, which are of course closely related to the normalized differences supplied by divider 423, provide the computer with a basis for varying the body angular velocity signal on line 440.

The continuously changing value in azimuth counter register 436 is supplied to comparator 434 on line 435. Comparator 434 continually tests the contents of azimuth counter register 436 against the contents of track azimuth register 429 supplied on line 431. Whenever equality is detected, a start signal is supplied on line 433 to enable and timing signals (ETS) subsystem 432. The time value expressed in this start signal causes ETS subsystem 432 to issue enable signals on lines 402–409 to analog gates 1–8, 442–449. ETS subsystem 432 also provides timing signals to the various elements which process the output of analog gates 442–449.

To explain operation of this apparatus, assume that at some point the computer contains an approximate value for the azimuth of body 102 at a specified instant of time, and an approximate value for the angular velocity of body 102. Also, by convention assume that rotation of body 102 is in such a direction that every star image passes across sensing surfaces 202a first, 203a second, and so on to sensing surfaces 209a, as implied in FIG. 2c. Responsive to an external signal, or an internally programmed condition, the computer becomes prepared to activate the apparatus of this invention. It is not important exactly how the apparatus is activated. For purposes of this discussion, assume that activation starts with an initialization phase wherein additional control lines to azimuth counter register 436 permit its clearing at a specified instant of time, which establishes the angular datum position. Previously, the computer supplies its internally stored value of the body angular velocity on line 440 to azimuth counter register oscillator 438. Oscillator 438 immediately begins sending pulses on line 437, each incrementing azimuth counter register 436 by one angle unit. From this point onward, azimuth counter register 436 will display an approximate instantaneous azimuth of body 102, which over time will drift further from the true value, due to error in the body angular velocity signal, absent corrections to its counting rate.

Further stored within the computer is at least one star azimuth approximation having the same reference azimuth on which the azimuth counter register 436 contents are based. That is, this approximation specified within tolerances to be explained later, the position of the star associated with it, in terms of angular displacement from body 102 orientation having an azimuth of O radians. The smallest of these azimuths are sent under control of the program within computer 106 to track azimuth register 429 via data line 427. Track azimuth register 429 stores this star azimuth and supplies it to comparator 434 on line 431. As azimuth counter register 436 continues to increment responsive to the pulses from oscillator 438, a time will come when contents of azimuth counter register 436 will be identical to the contents of track azimuth register 429. Comparator 434 detects this condition and supplies a start signal to ETC subsystem 432. This start signal encodes the time when the fields of view of sensors 202 and 203 will be enclosing the area of sky containing the star whose approximate azimuth is stored in the track azimuth register 439. If we assume that electronic delays through all the various elements of the system are negligible (not an unreasonable assumption) then the instant the start signal is issued can be the time encoded by it. If there are delays, the start signal can simply be issued enough earlier to compensate therefore.

Figure 4B:
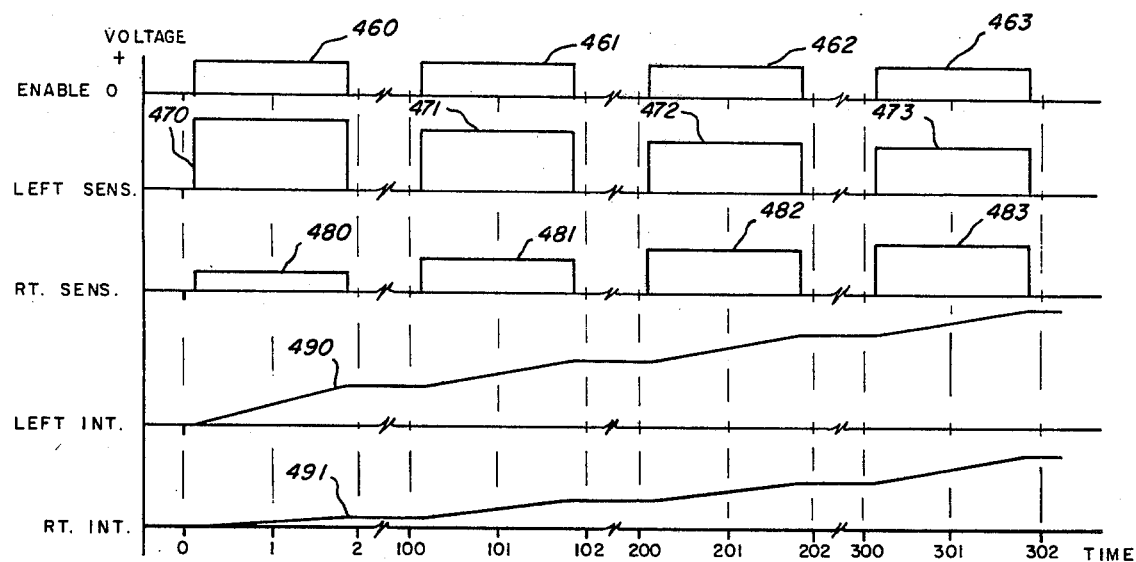
FIGS. 4b and 4c display signals associated with the sensors and the processing apparatus.

Responsive to the start signal, ETS subsystem 432 sends clear signals to integrators R and L 410 and 411 on line 450. Simultaneously, ETS subsystem 432 issues enable signals to analog gates 1 and 2, 442 and 443 on lines 402 and 403. These enable signals are shown in FIG. 4b as wave form 460.

The length of time gates 1 and 2 are enabled determines the size of the area of the celestial sphere swept over by the fields of view of sensor 202 and 203. It should be understood that each portion of the actual area in the celestial sphere scanned by each sensor does not contribute light energy for equal amounts of time due to the finite width of the field of view of each sensor. That is, if the field of view is only slightly smaller than the area scanned by it, still a portion of the leading and trailing edges of the scanned area will not be within the field of view of the sensor for as long as those more centrally located. If the scanned area is very large compared to the sensor's field of view, the same result obtains, because the leading and trailing edges of the scanned area will still not be within the field of view of the sensor for as long a time as those more centrally located in the scanned area, which are swept completely through by the sensor's field of view. This effect is most noticeable when the scanned area is approximately twice the width of the static field of view, because in this case the very central area of the swept-through area will be within the static field of view of the sensor for essentially 100 percent of the time. Areas more toward the edge of the swept-through area will be within the field of view for a length of time linearly decreasing from the 100 percent value and approaching zero. This characteristic can be minimized by selecting the size of the swept-through area to be either approximately the size of the sensor's field of view, or many times larger than it.

To simplify further explanation, assume that the area in the celestial sphere which each sensor sweeps through while its associated analog gate is enabled is approximately the size of the sensors' fields of view. This implies that the time duration of each enable signal is quite small compared to the transit time of a star image from one side of a sensing area to the other. The visualization is preferred for several reasons. It is consistent with FIGS. 2b, 2c, and 3 in the relative locations of the sensing surfaces illustrated therein. It provides for the simplest and most straightforward processing of the signal data from sensors 202–209. It is believed to be more easily understood than any of the other outlined relationships, in that the swept through area in the celestial sphere, during each sensor's gate enabling has the same dimensions of the static field of view, and hence can be easily visualized as co-extensive with the associated sensing area in focal plane 201. It should be understood, however, that the apparatus is well suited for, and functions effectively with a wide range of enable times.

Because of unavoidable imperfections in the optical characteristics of optical system 100, a star, which can be considered as a point source of light, appears as a blurred image in focal plane 201 with intensity increasing radially toward the center of the image in approximately a normal curve fashion. Thus, the relative magnitudes of the signal sent to integrators R and L 410 and 411 by the analog gates is a direct measure of the position of the star image with respect to any set of paired sensing surfaces during the time the analog gate was enabled. Turning to FIG. 4b, this effect can be easily noted, where the outputs of all of the left sensors (sensors 202, 204, etc.) are shown as the series of decreasing signals 470, 471, etc. and the outputs of the right sensors (sensors 203, 205, etc.) are shown as an increasing series of signals 480, 481, etc. The magnitude of change in signals 470–473 and 480–483 are greatly exaggerated, and display a situation where the scanned area of the sky is moving with successive sensor pairs, presumably because of an error in the vehicle angular velocity signal which affects the time each enable signal is issued. The time scale selected is in arbitrary units but as earlier noted each individual unit corresponds to a very small fraction of the total time required for a star image to transverse a sensing surface.

It is assumed that the accuracy of the star azimuth supplied on line 427 is sufficient to result in a statistically significant, i.e. detectable, amount of its light falling successively on at least one or more of the left hand sensing surfaces 202a, 204a, etc., or on one or more of the right hand sensing surfaces 203a, 205a, etc., while the associated analog gates are enabled. Statistical significance may only be present when dealing with a relatively dim star if a plurality of the signals are integrated together. This all can be clarified by reference to FIG. 4b wherein waveforms 460–463 are the actual enable signals supplied by ETS subsystem 432 on line 402–409. The more positive portion indicates the time during which the analog gates 442–449 are respectively enabled. Enable signal 460 is supplied on lines 402 and 403 to analog gates 1 and 2, 442 and 443. Enable signal 461 is supplied to analog gates 3 and 4, 444 and 445, via lines 404 and 405. Similarly, enable signals 462 and 463 are supplied to, respectively, analog gates 5 and 6, 416 and 417 and analog gates 7 and 8, 448 and 449. The time between the start of each enable signal issued by ETS subsystem 432 depends directly on the oscillator rate signal received by it on line 437a from ACR oscillator 438.

Signals 470–473 represent the output of analog gates 442, 444, 446 and 448 respectively, with all noise components removed for purpose of this example, and only the information present. Similarly, signals 480–483 represent the output of analog gates 443, 445, 447 and 449 respectively, with noise removed. Turning first to signals 470 and 480, it can be seen that the light received by sensor 202 is much greater than that received by sensor 203, because signal 470 is much greater than signal 480. This situation occurs because the point of maximum intensity of the image was within, or closer to the area swept through by sensor 202, than that of sensor 203. As can be seen, the individual output signals from analog gates 442, 444, 446, and 448 are successively smaller and those from gates 443, 445, 447, and 449 are successively larger. This condition implies that the vehicle angular velocity is not adjusted precisely to the actual angular velocity of vehicle 102, causing the position of the image vis-a-vis each successive sensing surface to be shifted slightly, in this case to the right in FIG. 2c. The vehicle angular velocity signal on line 440 should be increased slightly to counteract this drift. However, it should be understood that the actual individual outputs from sensors 202–209 are not used individually, except for purposes of forming the right and left integrals, and that the drift shown is greatly exaggerated. Right and left integral signals 490 and 491 illustrate generation of the integrations during the traversal of the sensing surfaces which produced signals 470–473 and 480–483. These two integral signals are proportional to the area under analog gate output signals 470–473 and 480–483, respectively. Since the width of each of these output signals is the same, being equal to the width of the enable signals 460–463 which have identical widths, and they are rectangular, integral signals 490 and 491 can be considered to actually represent the sum of the magnitudes of the two series of the signals.

Figure 4C:
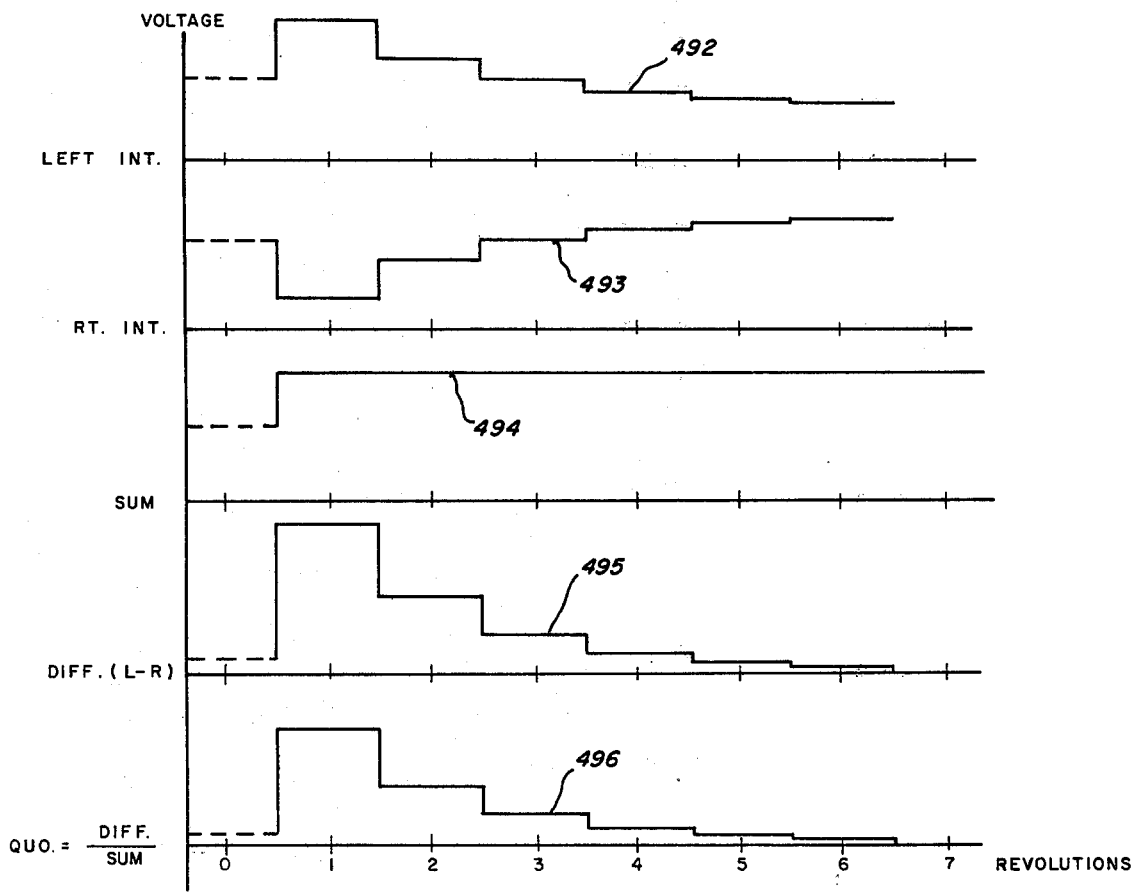

The output of integrator L 410 and integrator R 411 for a series of successive revolutions is shown in FIG. 4c as signals 492 and 493, respectively. Typical signal outputs of generator 422 are sum signal 494 and difference signal 495. Signal 496 is a typical output of divider 451 wherein difference signal 495 has been divided by sum signal 494, to produce quotient signal 496. Quotient signal 496 has thus been normalized and can be relied on to have a magnitude which is dependent on only the relative magnitudes of sum signal 494 and difference signal 495, rather than on their actual magnitudes. This allows relatively strong signals from a relatively strong star to have their signals reduced to within a selected range of values, and relatively weak signals increased to within the same range of values, and makes the integrals a function of the tracking error only. It should be understood that signals 492–496 have been selected as examples of typical signal changes which occur while the apparatus of FIG. 4a operates from the time an initial star azimuth approximation is supplied to the apparatus on track azimuth line 427 through several revolutions of body 102.

Sum and difference generator 422 also produces a track valid flag on line 425. The flag is set to indicate an invalid track if the sum produced is below a preselected threshold. This condition implies that no star was in the fields of view while enabled, or that a very weak star was present. In this case, the flag prevents the track azimuth register from updating the track azimuth. If the sum is above the specified threshold, the processing continues.

Turning again to FIG. 4a, assume during a particular revolution of body 102 at the instant the body reaches the reference azimuth position, the computer supplies an approximation of a star azimuth on track azimuth line 427 to track azimuth register 429. For some time previous, the computer has been supplying the body angular velocity signal on line 440, which controls the counting rate within azimuth counter register oscillator 438. As has been previously explained this will allow sensors 202-209 to be enabled sometime during the following revolution causing the generation of a quotient signal on line 451.

A preferred technique for decreasing the error present in track azimuth signal line 427 is to directly change the track azimuth signal in the appropriate direction and ignore for the time being errors in the body angular velocity signal on line 427. Referring to quotient signal 496, it can be seen that at the time the quotient signal is generated during revolution 0 a relatively large error exists in the track azimuth signal. The fact that the error is positive means that left-hand sensors 202, 204, 206, and 208 are receiving more light from the star involved then are the right-hand sensors 203, 205, 207, and 209. Dependent on system characteristics such as the size of the star image projected by optical system 201, actual speed of revolution of vehicle 102, and geometry and dimensions of sensing surfaces 202a–209a, it is possible to approximately determine the change which must be made in the track azimuth signal to reduce quotient signal 496 to zero. These can be combined in a simple linear equation specifying the amount by which the track azimuth signal should be changed to reduce the error by approximately one-half. Quotient signal 451 is multiplied by a positive scale factor within track azimuth register 429 and then added to the contents of track azimuth register 429 to correct the track azimuth. In the example shown, since quotient signal 496 is positive, track azimuth must be increased by the designated amount to cause the enabling of analog gates 442-449 to occur slightly later in time, when the star image has shifted slightly out of left-hand sensing surfaces 202a, 204a, 206a and 208a and into right-hand sensing surfaces 203a, 205a, 207a, and 209a. Similar changes in the contents of track azimuth register 429 occur during revolutions 2, 3, 4, and 5, reducing the error in track azimuth to a very small amount.

After errors in track azimuth have been reduced below a preselected value, it is possible to correct any errors in vehicle angular velocity 440. Each track azimuth is supplied to the computer. If the track azimuth is seen to persistently drift in one direction or the other, then vehicle angular velocity supplied on line 440 to ACR oscillator 438 by the computer may be changed over a series of revolutions in a manner similar to changes which occurred in the track azimuth signal, to correct the drift in track azimuth.

If only a single star is to be acquired, then its track azimuth may be permanently retained within track azimuth register 429, and the computer omitted if desired. If, however, as is usually the case several stars are being tracked simultaneously, it is necessary after each update of track azimuth in track azimuth register 429 that the new azimuth value be supplied to the computer on azimuth line 431 for storage therein pending approach of the star image to sensing surfaces 202a–209a on the succeeding revolution. As soon as each updated azimuth has been sent to computer 101 the azimuth for the next star must be immediately supplied to track azimuth register 429 via track azimuth register line 427. In this manner, a series of stars may be sensed and used to precisely determine the rate of rotation of body 102 and its precise angular position and velocity at given instant of time may be determined.

Figure 5:
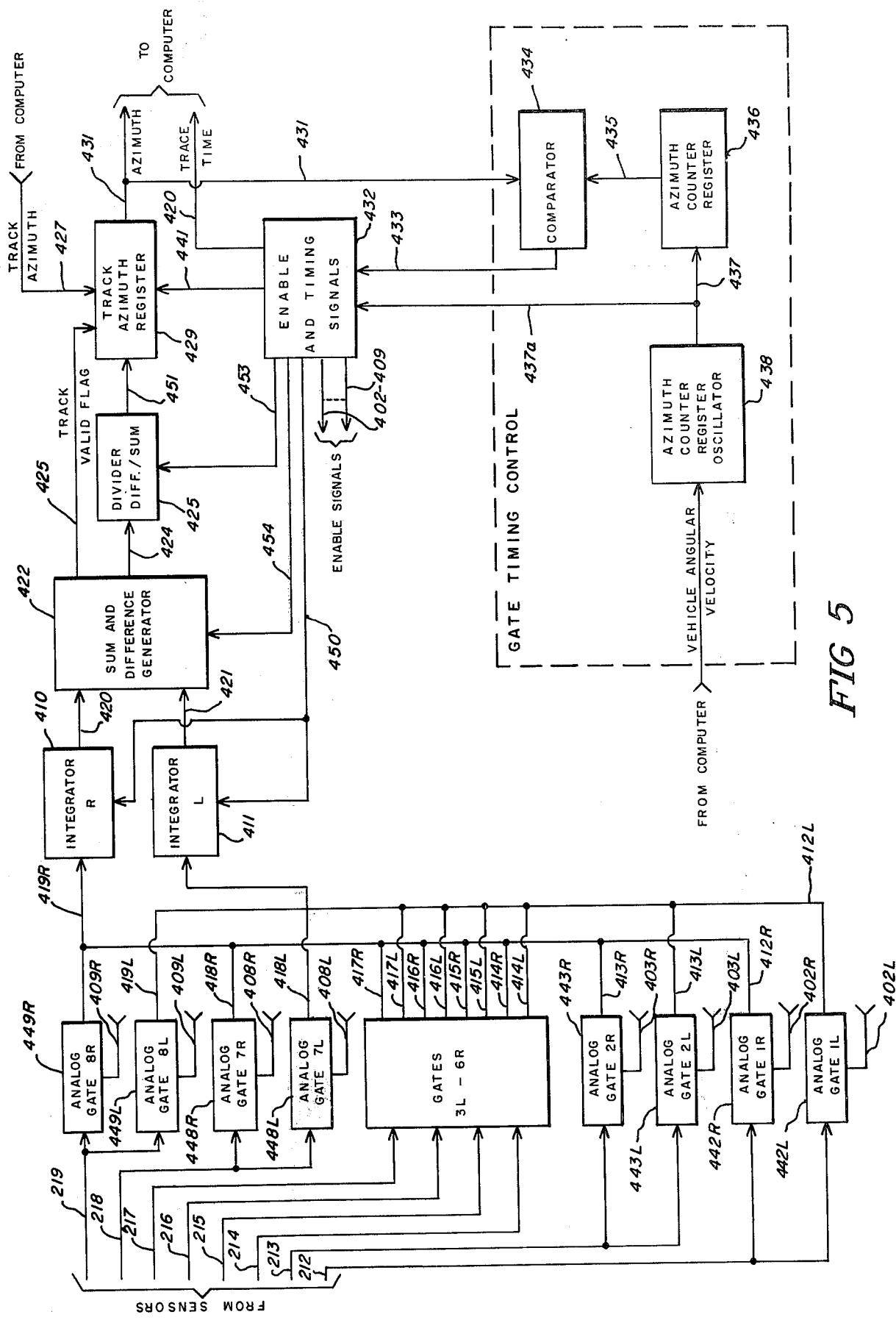

FIG. 5 shows a variation on the apparatus of FIG. 4a. Eight sensors are again employed and are connected to analog gates 442L–449R by signal lines 212-219. These 16 analog gates supply signals from sensors 202-209 to integrator R 410 and L 411 in the same fashion that such signals are supplied to these same integrators in FIG. 4a. The time at which each analog gate 442L–449R is enabled is again controlled by ETS subsystem 432. In this embodiment each sensor 202-209 supplies a signal to both integrator R 410 and L 411. Operation can be most easily understood by referring again to FIG. 2c. Consider star 210 during the following discussion as being fixed with respect to the paper with sensing surfaces 202a–209a rotating from right to left with respect to it. Assume that two sensing areas in annulus 103 have been chosen which correspond to the position occupied at the current instant by sensing surfaces 204a and 205a. Thus, the fields of view of sensing surfaces 202a and 203a have swept past the two selected areas of annulus 103. When star 210 was completely to the left of sensing areas 202a–209a all analog gates 442L–449R were disabled. When sensing surface 202a reached the precise point that sensing area 205a is now shown as occupying ETS subsystem 432 enabled analog gate 442R for the appropriate length of time as specified in the explanation of FIG. 4a. When sensing surface 202a reached the position currently occupied by sensing surface 204a, analog gate 442L was enabled by ETS subsystem 432. At the same time, since sensing surface 203a was occupying the position now occupied by sensing surface 205a, analog gate 443R was enabled, so that the signal from sensor 203 was supplied to integrator R 410. A short while later, sensing surface 203a moved to the position now occupied by sensing surface 204a, and analog gate 443L was enabled, supplying the signal from sensor 203a to integrator L 411. As each of the six remaining sensing surfaces 204a–209a occupied or occupy the positions now occupied by sensing surfaces 205a and 204a, the respective analog gates are enabled to supply the output from the corresponding sensors to integrators R 411 and L 410. In this manner, each sensor scans both selected areas of annulus 103 within the star 210 is located. This embodiment provides for increased sensitivity, for an equal number of sensors because each sensor scans and senses radiant energy from both selected areas of annulus 103.

In the embodiment of FIG. 5 as explained above, it was assumed that sensing areas 202a–209a were physically located with respect to each other as shown in FIGS. 2b and 2c. It may, however, be desirable to locate these sensing surfaces with respect to each other physically in a different manner than the paired positioning shown in FIG. 2c. One obvious option might be to space them at equal angles with respect to each other, these angles being selected so as to permit each enable signal to the analog gates to occur at a fixed time later than the enable for the immediately preceeding one.

In discussing the embodiment of FIGS. 4a and 5, it was assumed that the area in annulus 103 swept through by the field of view of each sensor was of dimensions almost identical to that of the static field of view of each sensor. This, of course, is not necessary to the functioning of the apparatus. It should be clearly understood that the invention is intended to include embodiments wherein the swept-through area is chosen to have dimensions varying from approximately that of the static field of view of the individual sensors to many times these fields of view, as long as other relationships specified are not violated. e.g., if in FIG. 2c each swept-through area had an angular dimension 10 times that of each static field of view, then the sensing surface of a sensor pair would have to be located physically further apart, to prevent undesirable overlap of the two swept through areas. Alternatively, each sensing surface 202a–209a could be made very much narrower than shown, and thereby achieve the same result.

It should also be clearly understood that the selection of 8 sensors in the example was governed by a desire for clarity in explanation. In an actual embodiment, as many as 50 or 100 sensors may be advantageously employed. Other alternatives in the details of construction of this apparatus are also possible. The inventor wishes to claim any and all such embodiments which incorporate the novel and non-obvious features of this invention in the following claims.

I claim:

1. Apparatus receiving an angular velocity signal encoding the approximate speed of rotation of a body with respect to an external radiant energy source directing radiant energy toward the body and supplying signals indicative of the angular position of the body with respect to the radiant energy source, comprising:
   a. first through at least second radiant energy sensors each having a predetermined field of view, and adapted to be positioned in the body so that the predetermined field of view of each sensor sweeps over the radiant energy source by ascending numerical order of the sensors with each revolution of the body, each sensor producing, responsive to enable signal, an output signal indicating the amount of radiant energy directed toward the sensor from within its field of view during a sensing interval specified by the enable signal;
   b. sensor enabling means receiving the angular velocity signal for issuing responsive thereto an enable signal to each sensor during at least two successive revolutions of the body causing a sensing interval of at least two sensors to occur while their fields of view are sweeping over a first selected area and a sensing interval of at least two sensors to occur while their fields of view are sweeping over a second selected area, the two areas being selected such that the radiant energy source is within the field of view of at least one sensor during its sensing interval on at least two successive rotations of the body; and
   c. signal integration means receiving the sensor output signals for producing for each rotation of the body first and second integration signals respectively encoding the total radiant energy received by the sensors during their sensing intervals while their fields of view are sweeping over the first and second selected areas, whereby the difference in said integration signals is indicative of the angular position of the body with respect to the radiant energy source.

2. The apparatus of claim 1, wherein the field of view of each sensor is substantially identical.

3. The apparatus of claim 2, wherein each sensor is mounted such that the fields of view of the sensors sweep through substantially identical areas as the body rotates.

4. The apparatus of claim 3, wherein the sensor enabling means includes means for issuing enable signals at times causing the two selected areas to be substantially bilaterally symetrical with respect to, and on opposite sides of a line perpendicular to the motion of the fields of view.

5. The apparatus of claim 1, wherein the enable signals are indicative of the angular position of the body respective the radiant energy source, and wherein the sensor enabling means further comprises first equalizing means receiving the integration signals issued during one revolution of the body and varying the enable signals to cause the sensing intervals to shift in a manner tending to cause the total radiant energy from the radiant energy source represent by the first integration signal issued on a following revolution of the body to more closely equal that represented by its associated second integration signal.

6. The apparatus of claim 1, wherein the sensor enabling means further comprises second equalizing means receiving the integration signals from successive revolutions of the body and varying the enable signals to cause the rate of sensing intervals to change in a manner tending to cause the total radiant energy from the radiant energy source as represented by the first integration signal to more closely equal the first integration signal of a following revolution of the body, than it equalled the first integration signal of a preceding revolution.

7. The apparatus of claim 1, including at least four sensors, wherein the sensor enabling means further comprises means for causing the sensing interval of the odd-numbered sensors to coincide with the sweep of their fields of view over the first selected area, and the sensing interval of the even-numbered sensors to coincide with the sweep of their fields of view over the second selected area.

8. The apparatus of claim 7, wherein the sensors have substantially identical fields view, and the sensor enabling means includes means for issuing enable signals causing the first and second selected areas to be substantially bilaterally symmetrical with respect to a line perpendicular to the motion of the fields of view.

9. The apparatus of claim 7, wherein each sensor pair comprises an odd-numbered sensor and the sensor numbered one greater and the combined field of view of each sensor pair is substantially bilaterally symmetrical with respect to a line perpendicular to the motion of the fields of view.

10. The apparatus of claim 9, wherein the fields of view of the odd-numbered sensors are substantially identical and equally spaced from the respective fields of view of the even-numbered sensors numbered one greater.

11. The apparatus of claim 10, wherein the facing edges of the fields of view of the sensors comprising each pair comprise the same straight line.

12. The apparatus of claim 7, wherein the enable signals are indicative of the angular position of the body respective the radiant energy source, and wherein the sensor enabling means further comprises first equalizing means receiving the integration signals, for comparing the two integration signals issued during one revolution of the body and varying the enable signals to cause the sensing intervals to shift in a manner tending to cause the total radiant energy from the radiant energy source as represented by the first integral signal issued on a following revolution of the body to more closely equal that represented by its associated second integration signal.

13. The apparatus of claim 12, wherein the first equalizing means further comprises means for issuing enable signals causing each sensing interval to be shifted later in time responsive to a pair of associated integration signals indicating more radiant energy received by the odd-numbered sensors during their sensing intervals than by the even-numbered sensors during their sensing intervals and issuing enable signals causing each sensing interval to be shifted earlier in time responsive to a pair of associated integration signals indicating less radiant energy received by the odd-numbered sensors during their sensing intervals than by the even-numbered sensors during their sensing intervals.

14. The apparatus of claim 1, wherein the signal enabling means further comprises means for issuing enable signals causing a sensing interval to occur for each sensor while its field of view is sweeping over each preselected area.

15. The apparatus of claim 14, further comprising multiplexing means in the signal integration means, for separating each sensor output signal into a first portion issued while the field of view was sweeping over the first selected area, and a second portion issued while the field of view was sweeping over the second selected area.

16. The apparatus of claim 1, wherein the sensor enabling means further comprises means receiving the integration signals, for issuing enable signals to the sensors causing the sensing interval to become shorter responsive to the radiant energy received by the sensors as represented by the first integration signal becoming more equal to the radiant energy received by the sensors as represented by the second integration signal.

* * * * *